(12) United States Patent
Nakasha

(10) Patent No.: US 11,454,914 B2
(45) Date of Patent: Sep. 27, 2022

(54) IMAGING SYSTEM AND DEFECT DETECTION PROGRAM BASED ON TONER IMAGE CHECK PATTERN DATA

(71) Applicant: HEWLETT-PACKARD DEVELOPMENT COMPANY, L.P., Spring, TX (US)

(72) Inventor: Shinya Nakasha, Yokohama (JP)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/270,676

(22) PCT Filed: Sep. 9, 2019

(86) PCT No.: PCT/US2019/050182
§ 371 (c)(1),
(2) Date: Feb. 23, 2021

(87) PCT Pub. No.: WO2020/055735
PCT Pub. Date: Mar. 19, 2020

(65) Prior Publication Data
US 2021/0341867 A1 Nov. 4, 2021

(30) Foreign Application Priority Data
Sep. 10, 2018 (JP) .............................. JP2018-168727

(51) Int. Cl.
*G03G 15/00* (2006.01)
*G06K 15/02* (2006.01)
*G06K 15/00* (2006.01)

(52) U.S. Cl.
CPC ......... *G03G 15/5062* (2013.01); *G03G 15/55* (2013.01); *G06K 15/027* (2013.01); *G06K 15/408* (2013.01)

(58) Field of Classification Search
USPC .......................................................... 399/15
See application file for complete search history.

(56) References Cited

U.S. PATENT DOCUMENTS

| 8,131,168 B2 | 3/2012 | Omoya | |
|---|---|---|---|
| 2003/0091357 A1* | 5/2003 | Maebashi | G03G 15/5058 399/49 |

(Continued)

FOREIGN PATENT DOCUMENTS

| JP | 2006091184 A * | 4/2006 | ......... G03G 15/5062 |
|---|---|---|---|
| JP | 2014-230237 | 12/2014 | |

(Continued)

*Primary Examiner* — Quana Grainger
(74) *Attorney, Agent, or Firm* — Staas & Halsey LLP

(57) ABSTRACT

An imaging system includes a toner imaging device to form a toner image, a toner image conveying device to convey the toner image, a medium conveying device to convey a medium, and a toner image recording device to record the toner image conveyed by the toner image conveying device on the medium conveyed by the medium conveying device. Additionally, the imaging system includes a control device to determine a stop state including at least one of a state where a recording check toner image is recorded on the medium, a state where a conveyance check toner image is positioned on the toner image conveying device, and a state where a formation check toner image is positioned on the toner imaging device. During the stop state, the control device stops a formation of the toner image that is performed by the toner imaging device, stops a conveyance of the toner image that is performed by the toner image conveying device, and stops a conveyance of the medium that is performed by the medium conveying device.

20 Claims, 11 Drawing Sheets

(56) References Cited

U.S. PATENT DOCUMENTS

| | | | |
|---|---|---|---|
| 2009/0028587 A1 | 1/2009 | Hanashi et al. | |
| 2010/0067061 A1* | 3/2010 | Hayashi | G06T 5/005 |
| | | | 358/3.26 |
| 2013/0162712 A1 | 6/2013 | Yamanobe | |
| 2015/0350479 A1 | 12/2015 | Nogawa | |
| 2018/0239290 A1* | 8/2018 | Tomii | G03G 15/55 |

FOREIGN PATENT DOCUMENTS

| | | |
|---|---|---|
| JP | 2015-87551 | 5/2015 |
| JP | 2016-114921 | 6/2016 |
| JP | 2016-224146 | 12/2016 |

\* cited by examiner

IMAGING SYSTEM AND DEFECT DETECTION PROGRAM BASED ON TONER IMAGE CHECK PATTERN DATA

CROSS REFERENCE TO RELATED APPLICATIONS

This application is a U.S. National Stage Application which claims the benefit under 35 U.S.C. § 371 of International Patent Application No. PCT/US2019/050182 filed on Sep. 9, 2019, which claims priority from Japanese Patent Application No. 2018-168727 filed on Sep. 10, 2018, the contents of each of which are incorporated herein by reference.

BACKGROUND

Image defects or aberrations, such as vertical streaks, may occur in an image forming device. As such the image forming device may compare reference data with a reference image that outputs the reference data to determine whether or not an image defect is present.

DETAILED DESCRIPTION

In the following description, with reference to the drawings, the same reference numbers are assigned to the same components or to similar components having the same function, and overlapping description is omitted. An imaging system may be an imaging apparatus, such as a printer, or may be a defect detection system or the like to be mounted on an imaging apparatus.

Figure 1:
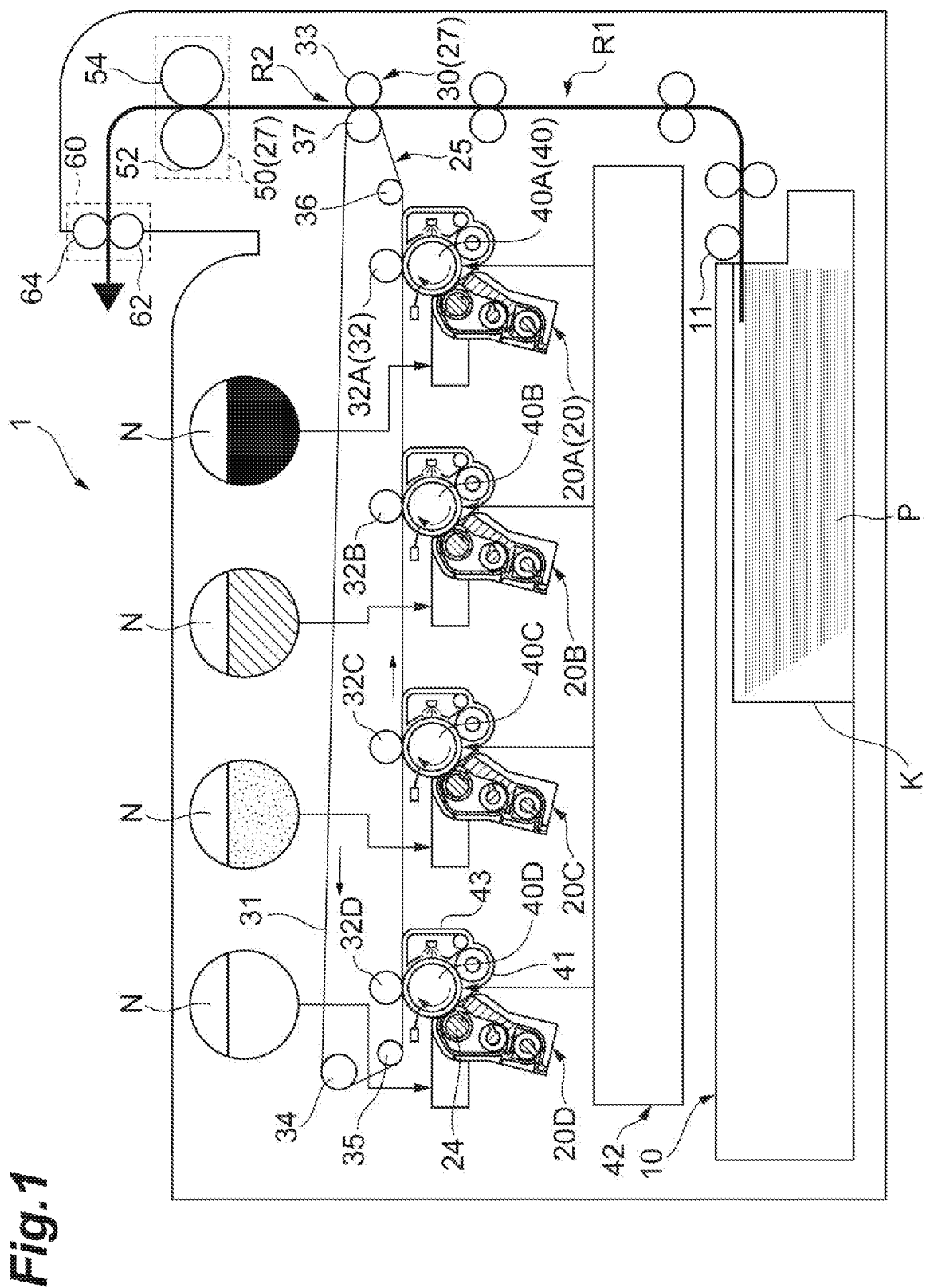
FIG. 1 is a schematic diagram illustrating an example imaging apparatus.

FIG. 1 is a diagram illustrating the schematic structure of an example imaging apparatus. The imaging apparatus 1 illustrated in FIG. 1 may be configured to form a color image using a plurality of colors, for example, black, cyan, magenta, and yellow. The imaging apparatus 1 includes, for example, a medium conveying device 10 that conveys a sheet P serving as an example of a recording medium on which an image is to be formed. Additionally, the imaging apparatus 1 may include one or more image carriers 40 on which electrostatic latent images are formed on the surfaces (peripheral surfaces) thereof, and one or more developing devices 20 that develop the electrostatic latent images to form toner images on the image carriers 40. The imaging apparatus 1 may also include a toner image conveying device 25 that conveys the toner images, a toner image recording device 27 that records the toner images on the sheets P, and a discharge device 60 that discharges the sheet P. The developing devices 20 may include toner imaging devices that form toner images. The toner image recording device 27 may include, for example, a transfer device 30 that transfers the toner images to the sheet P and a fixing device 50 that fixes the toner images to the sheet P.

The medium conveying device 10 conveys the sheet P on a conveying path R1. For example, the sheet P is stacked and received in a cassette K, and is picked up and conveyed by a sheet feed roller 11. Additionally, the medium conveying device 10 may allow the sheet P to reach a transfer nip portion R2 through the conveying path R1 at a timing when the toner image to be transferred to the sheet P reaches the transfer nip portion R2.

Four developing devices 20 may be provided so as to correspond to the respective colors. For example, a developing device 20A corresponding to black, a developing device 20B corresponding to cyan, a developing device 20C corresponding to magenta, and a developing device 20D corresponding to yellow are provided as the developing devices 20. In some examples, the developing device 20A, the developing device 20B, the developing device 20C, and the developing device 20D are arranged in this order toward the upstream side (the left side in FIG. 1) from the downstream side (the right side in FIG. 1) in a conveying direction of the toner images. Each of the developing devices 20 includes, for example, a developer carrier 24 that allows a toner to be carried on the image carrier 40. For example, a two-component developer including a toner and a carrier may be used in the developing device 20 as a developer. In some examples, the developing device 20 adjusts a toner and a carrier to a particular mixture ratio and mixes and agitates the toner and the carrier to uniformly disperse the toner. Accordingly, a developer to which the optimum amount of electric charges is applied is adjusted. This developer is carried on the developer carrier 24. The developer carrier 24 conveys the developer to an area facing the image carrier 40 by being rotated. Then, the toner of the developer, which is carried on the developer carrier 24, is moved to the electrostatic latent image formed on the peripheral surface of the image carrier 40, so that the electrostatic latent image is developed.

In some examples, the toner image conveying device 25 conveys the toner images, which are formed by the developing devices 20, to the transfer nip portion R2 where the toner images are secondarily transferred to the sheet P. The toner image conveying device 25 includes, for example, a transfer belt 31 to which the toner images are to be initially transferred from the image carriers 40, suspension rollers 34, 35, 36, and 37 that suspend the transfer belt 31, and primary transfer rollers 32 that hold the transfer belt 31 together with the image carriers 40.

The transfer belt 31 may include an endless belt that is rotationally moved by the suspension rollers 34, 35, 36, and 37. Each of the suspension rollers 34, 35, 36, and 37 may include a roller that is rotatable about an axis thereof. For example, the suspension roller 37 may include a driving roller that rotationally drives about an axis, and the suspension rollers 34, 35, and 36 may include driven rollers that are driven by the rotational drive of the suspension roller 37. In some examples, the primary transfer rollers 32 are provided so as to press the image carriers 40 from the inner peripheral side of the transfer belt 31. The primary transfer rollers 32 are provided so as to correspond to the image carriers 40. For example, a primary transfer roller 32A may be configured to press an image carrier 40A, a primary transfer roller 32B may be configured to press an image carrier 40B, a primary transfer roller 32C may be configured to press an image carrier 40C, and a primary transfer roller 32D may be configured to press an image carrier 40D.

In some examples, the transfer device 30 secondarily transfers the toner images, which are conveyed by the toner image conveying device 25, to the sheet P. The transfer device 30 may include the suspension roller 37 that forms a part of the toner image conveying device 25 and a secondary transfer roller 33 that holds the transfer belt 31 together with the suspension roller 37.

The secondary transfer roller 33 may be disposed parallel to the suspension roller 37 with the transfer belt 31 interposed therebetween and is provided so as to press the suspension roller 37 from the outer peripheral side of the transfer belt 31. Accordingly, the secondary transfer roller 33 forms the transfer nip portion R2 between itself and the transfer belt 31.

The image carrier 40 may also be referred to as an electrostatic latent image carrier, a photoreceptor drum, and the like. Four image carriers 40 may be provided so as to correspond to four respective colors. Additionally, the respective image carriers 40 may be provided along the moving direction of the transfer belt 31. In some examples, the image carrier 40A corresponding to black, the image carrier 40B corresponding to cyan, the image carrier 40C corresponding to magenta, and the image carrier 40D corresponding to yellow are provided as the image carriers 40. The developing device 20A is provided with the image carrier 40A, the developing device 20B is provided with the image carrier 40B, the developing device 20C is provided with the image carrier 40C, and the developing device 20D is provided with the image carrier 40D. The developing device 20, a charging roller 41, an exposure unit (e.g., an exposure device) 42, and a cleaning device 43 may be provided on the periphery of each image carrier 40.

The charging roller 41 may include charging means for uniformly charging the surface of the image carrier 40 to a predetermined potential. In some examples, the charging roller 41 moves while following the rotation of the image carrier 40. Additionally, the exposure unit 42 may be configured to expose the surface of the image carrier 40 that is charged by the charging roller 41, according to an image to be formed on the sheet P. Accordingly, the potential of a portion, which is exposed by the exposure unit 42, of the surface of each image carrier 40 is changed and an electrostatic latent image is formed. The four developing devices 20 may be configured to develop the electrostatic latent images, which are formed on the image carriers 40, by toners that are supplied from toner tanks N provided so as to face the respective developing devices 20, and to form toner images. For example, the toner tanks N are filled with a magenta toner, a yellow toner, a cyan toner, and a black toner, respectively. Additionally, each cleaning device 43 may be configured to collect a toner that remains on the image carrier 40 after the toner image formed on the image carrier 40 is initially transferred to the transfer belt 31.

In some examples, the fixing device 50 allows the toner images, which are secondarily transferred to the sheet P from the transfer belt 31, to adhere and be fixed to the sheet P by allowing the sheet P to pass through a fixing nip portion R3 where heat and pressure are applied. The fixing device 50 may include a heating roller 52 that heats the sheet P and a pressure roller 54 that presses and rotationally drives the heating roller 52. The heating roller 52 and the pressure roller 54 are formed in, for example, a cylindrical shape, and a heat source, such as a halogen lamp, is provided in the heating roller 52. The fixing nip portion R3, which is a contact area, is provided between the heating roller 52 and the pressure roller 54. In a case where the sheet P is allowed to pass through the fixing nip portion R3, the toner images are heated and fixed (e.g., fused) to the sheet P.

The discharge device 60 includes, for example, discharge rollers 62 and 64 that are used to discharge the sheet P to which the toner images are fixed by the fixing device 50 to the outside of the apparatus.

An example printing operation which may be performed by the imaging apparatus 1 will now be described. In a case where an image signal of an image to be recorded is input to the imaging apparatus 1, a control unit of the imaging apparatus 1 allows the sheet feed roller 11 to be rotated to pick up and convey a sheet P stacked in the cassette K. Then, the surfaces of the image carriers 40 are uniformly charged to a predetermined potential by the charging rollers 41 (charging operation). After that, the surfaces of the image carriers 40 are irradiated with a laser beam by the exposure unit 42 on the basis of the received image signal, so that electrostatic latent images are formed (exposure operation).

In the developing devices 20, the electrostatic latent images are developed and toner images are formed (developing operation). The toner images, which are formed in this way, are initially transferred to the transfer belt 31 from the image carriers 40 in areas where the image carriers 40 face the transfer belt 31 (transfer operation). The toner images, which are formed on the four image carriers 40, are superimposed on the transfer belt 31, so that one composite toner image is formed. Then, after the composite toner image is conveyed to the transfer belt 31, the composite toner image is secondarily transferred to the sheet P, which is conveyed from the medium conveying device 10, at the transfer nip portion R2 where the suspension roller 37 and the secondary transfer roller 33 face each other.

The sheet P to which the composite toner image is secondarily transferred is conveyed to the fixing device 50. Then, when the sheet P passes through the fixing nip portion R3, the fixing device 50 fuses or otherwise fixes the composite toner image to the sheet P by applying heat and pressure to the sheet P between the heating roller 52 and the pressure roller 54 (fixing operation). After that, the sheet P is discharged to the outside of the imaging apparatus 1 by the discharge rollers 62 and 64.

Figure 2:
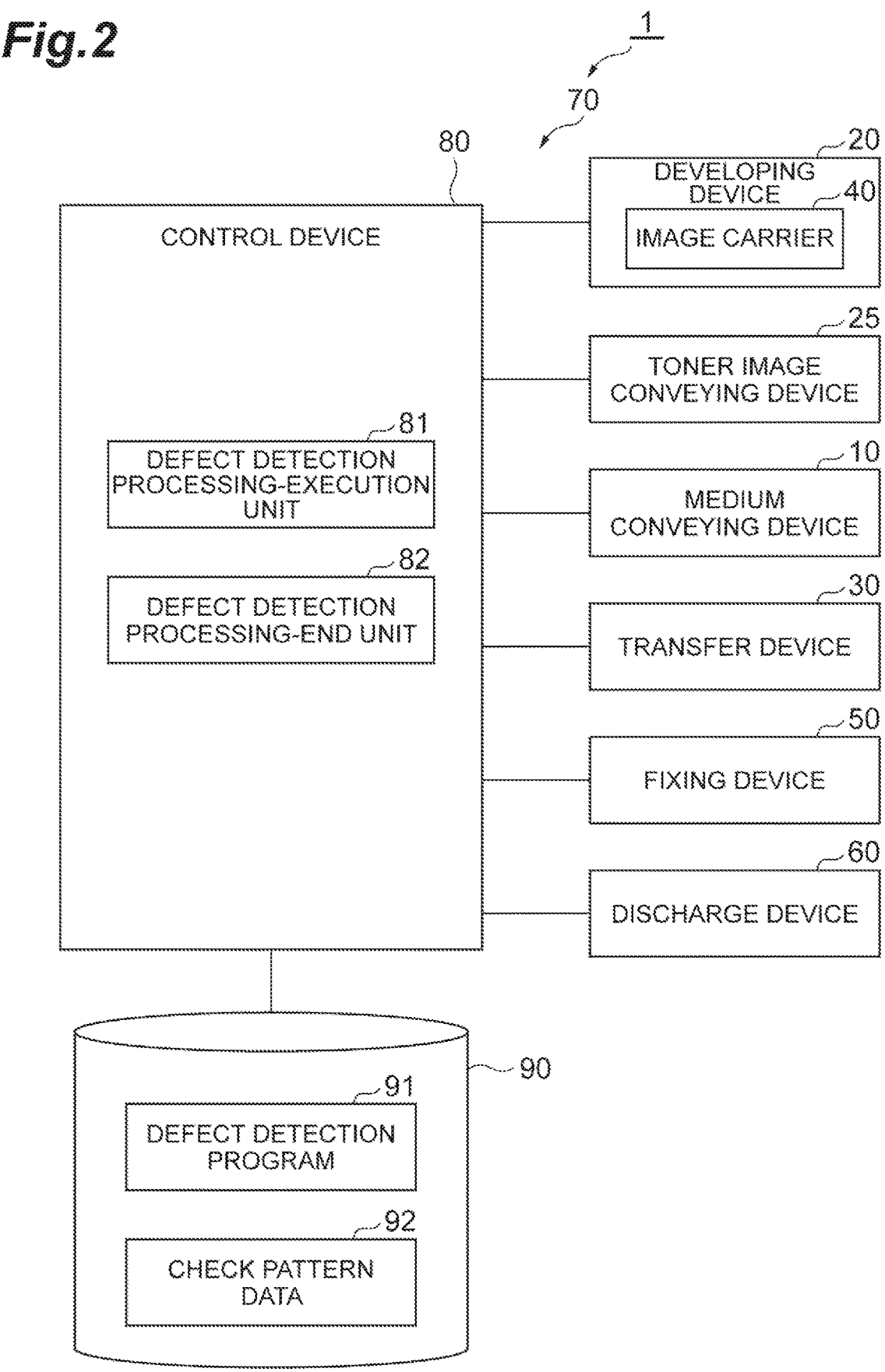
FIG. 2 is a block diagram illustrating an example defect detection system.

As illustrated in FIG. 2, the imaging apparatus 1 includes a defect detection system 70. The defect detection system 70 is a system that executes a defect detection process for specifying a component, device, system or region where an image defect occurs and a defect-detection-end process in a case where the image defect occurs. The defect detection system 70 includes, for example, a control device 80, a memory 90, the developing devices 20 (the image carriers 40), the toner image conveying device 25, the medium conveying device 10, the transfer device 30, the fixing device 50, and the discharge device 60.

The control device 80 may include an electronic control unit (computer) that executes the defect detection processing. The control device 80 controls, for example, one or more of the drive of the developing devices 20 (the image carriers 40), the toner image conveying device 25, the medium conveying device 10, the transfer device 30, the fixing device 50, and the discharge device 60, in performing the defect detection process. The memory 90 includes a computer-readable memory that can be read by the control device 80. For example, a defect detection program 91 for executing the defect detection process is recorded in the memory 90, and the control device 80 reads and executes the defect detection program 91 from the memory 90 to execute the defect detection process and the defect-detection-end process. In some examples, the defect detection program 91 is a program that allows the control device 80, which is a computer, to execute the defect detection process and the defect-detection-end process. The control device 80 may include a single electronic control unit, or a plurality of electronic control units. The control device 80 may be configured to selectively or in some cases exclusively execute the defect detection processing and the defect-detection-end processing, and in some examples may be configured to execute other operations of the imaging apparatus 1.

The control device 80 includes, for example, a defect detection processing-execution unit (e.g., a defect detection processing-execution device) 81 and a defect detection processing-end unit (e.g., a defect detection processing-end device) 82.

The defect detection processing-execution unit 81 executes the defect detection process in response to, for example, an operation performed by a checker, such as a worker. Here, the defect detection process, which is executed by the defect detection processing-execution unit 81, will be described with reference to FIGS. 3 and 4.

In a case where an image defect occurs, one or more of the developing devices 20, the toner image conveying device 25, the transfer device 30, and the fixing device 50 may be considered as a cause of the image defect. There may be, for example, damage to the image carriers 40, a defective charging of the image carriers 40, and the like as a reason of the image defect caused by the developing device 20. There may be, for example, damage to the transfer belt 31 or the primary transfer rollers 32, and the like as a reason of the image defect caused by the toner image conveying device 25. Additionally, there may be, for example, damage to the secondary transfer roller 33 or the suspension roller 37, and the like as a reason of the image defect caused by the transfer device 30. Still further, there may be, for example, damage to the heating roller 52 or the pressure roller 54, a defect of the heat source of the heating roller 52, a defect of a pressure-applying mechanism of the pressure roller 54, and the like as a reason of the image defect caused by the fixing device 50.

Accordingly, the defect detection processing-execution unit 81 acquires check pattern data that includes fixing check toner images, transfer check toner images, conveyance check toner images, and formation check toner images. In some examples, a bitmap format can be used as the format of the check pattern data. The fixing check toner image may include a check pattern that is used to determine whether or not the image defect is caused by the fixing device 50, and may be carried on at least one of the plurality of image carriers 40 (the image carrier 40A, the image carrier 40B, the image carrier 40C, and the image carrier 40D) as a toner image. The transfer check toner image may include a check pattern that is used to determine whether or not the image defect is caused by the transfer device 30, and is may be on at least one of the plurality of image carriers 40 (the image carrier 40A, the image carrier 40B, the image carrier 40C, and the image carrier 40D) as a toner image. Additionally, the conveyance check toner image may include a check pattern that is used to determine whether or not the image defect is caused by the toner image conveying device 25, and may be carried on each of the plurality of image carriers 40 (the image carrier 40A, the image carrier 40B, the image carrier 40C, and the image carrier 40D) as a toner image. Still further, the formation check toner image may include a check pattern that is used to determine whether or not the image defect is caused by the developing devices 20, and may be carried on each of the plurality of image carriers 40 (the image carrier 40A, the image carrier 40B, the image carrier 40C, and the image carrier 40D) as a toner image.

When both the transfer device 30 and the fixing device 50 are configured to form the toner image recording device 27 that records the toner images on the sheet P, the fixing check toner image and the transfer check toner image may also function as a recording check toner image. The recording check toner image may include a check pattern that is used to determine whether or not the image defect is caused by the toner image recording device 27, and may be carried on at least one of the plurality of image carriers 40 (the image carrier 40A, the image carrier 40B, the image carrier 40C, and the image carrier 40D) as a toner image.

The fixing check toner image, the transfer check toner image, the conveyance check toner image, and the formation check toner image may have the same shape or may have shapes that are different from each other. Further, the fixing check toner image, the transfer check toner image, the conveyance check toner image, and the formation check toner image may have any shape, and may have, for example, a rectangular shape that extends in the width direction of an image formed by the imaging apparatus 1, that is, the axial direction of the image carrier 40. Furthermore, the width of each of the fixing check toner image, the transfer check toner image, the conveyance check toner image, and the formation check toner image may be equal to or larger than the maximum width W of an image formed by the imaging apparatus 1. The widths of these images correspond to a width in the axial direction of the image carrier 40.

The check pattern data may be configured so that one or more of the following operations or operating states may be achieved: (1) the fixing check toner image carried on at least one of the plurality of image carriers 40 is fixed to the sheet P, (2) the transfer check toner image carried on at least one of the plurality of image carriers 40 is transferred to the sheet P and is positioned on the upstream side of the fixing device 50, (3) the conveyance check toner images carried on the respective plurality of image carriers 40 are positioned on the transfer belt 31 between the plurality of image carriers 40 and between the image carrier 40, which is closest to the transfer device 30, and the transfer device 30, respectively, and (4) the formation check toner images are positioned on the plurality of image carriers 40, respectively, in a case where the developing devices 20, the toner image conveying device 25, the transfer device 30, and the fixing device 50 are operated.

In some examples, each of the fixing check toner image and the transfer check toner image may be adapted to be carried on one of the plurality of image carriers 40. On the other hand, the fixing check toner image and the transfer check toner image may be adapted to be carried on each of the plurality of image carriers 40. In the latter case, the fixing check toner images and the transfer check toner images, which are carried on the respective plurality of image carriers 40, may overlap each other and be transferred to the transfer belt 31. Further, the fixing check toner image, the transfer check toner image, the conveyance check toner image, and the formation check toner image may be spaced apart from each other.

Figure 4:
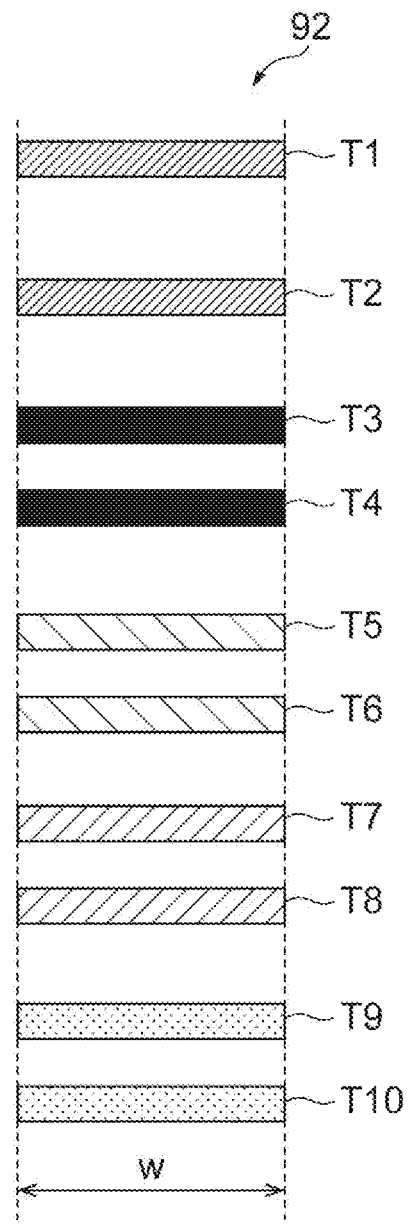
FIG. 4 is a diagram illustrating an example evaluation pattern.

Check pattern data 92 illustrated in FIG. 4 includes a first toner image T1. The first toner image T1 may include one or more of a fixing check toner image, a second toner image T2 that is a transfer check toner image, a third toner image T3 that is a conveyance check toner image, a fourth toner image T4 that is a formation check toner image, a fifth toner image T5 that is a conveyance check toner image, a sixth toner image T6 that is a formation check toner image, a seventh toner image T7 that is a conveyance check toner image, an eighth toner image T8 that is a formation check toner image, a ninth toner image T9 that is a conveyance check toner image, and a tenth toner image T10 that is a formation check toner image.

Figure 3:
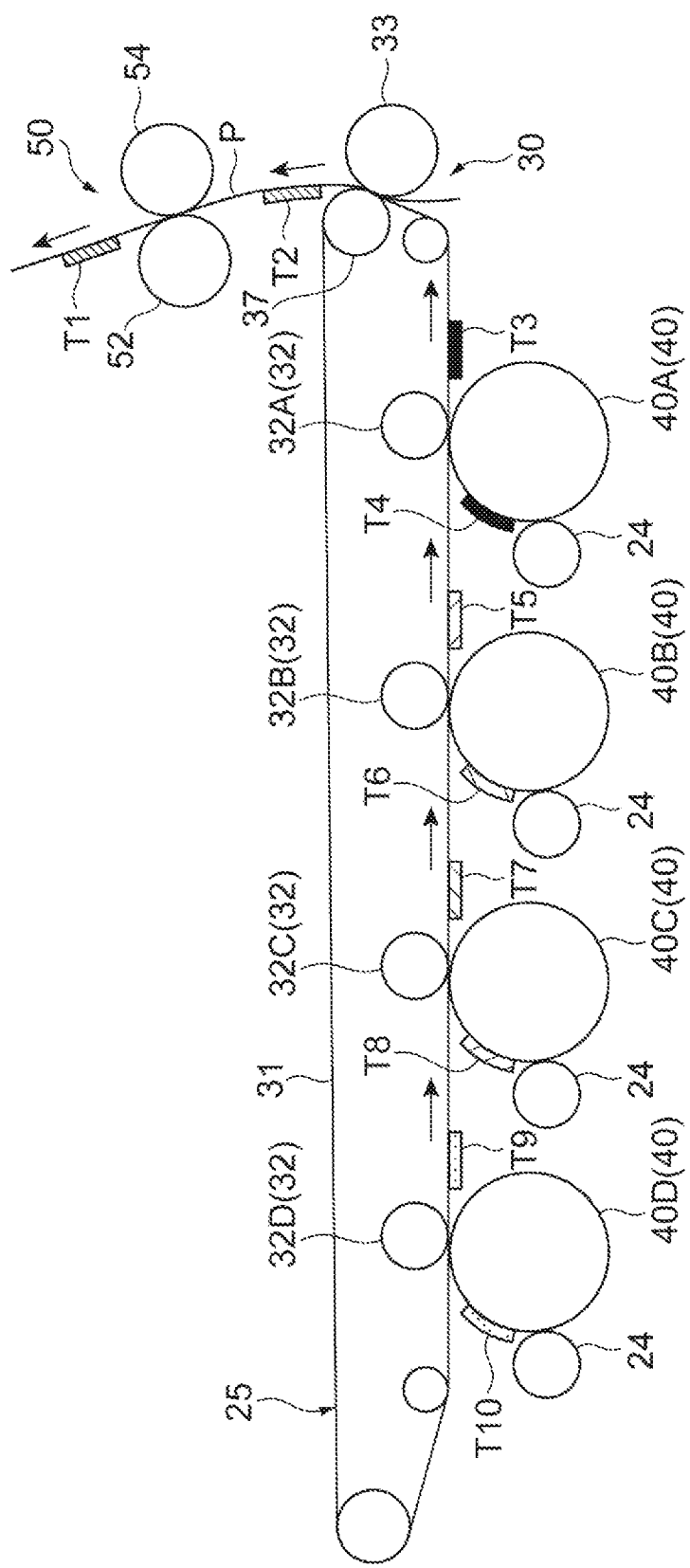
FIG. 3 is a schematic diagram for describing example defect detection processing.

The example check pattern data 92 illustrated in FIG. 3 may be configured so that one or more of the following operations or operating states may be achieved: (1) the first toner image T1 is fixed to the sheet P, (2) the second toner image T2 is transferred to the sheet P and is positioned on the upstream side of the fixing device 50, (3) the third toner image T3 is positioned on the transfer belt 31 between the image carrier 40A and the transfer device 30, (4) the fourth toner image T4 is positioned on the image carrier 40A, (5) the fifth toner image T5 is positioned on the transfer belt 31 between the image carrier 40A and the image carrier 40B, (6) the sixth toner image T6 is positioned on the image carrier 40B, (7) the seventh toner image T7 is positioned on the transfer belt 31 between the image carrier 40B and the image carrier 40C, (8) the eighth toner image T8 is positioned on the image carrier 40C, (9) the ninth toner image T9 is positioned on the transfer belt 31 between the image carrier 40C and the image carrier 40D, and (10) the tenth toner image T10 is positioned on the image carrier 40D.

In a case where the check pattern data is recorded in the memory 90, the defect detection processing-execution unit 81 can acquire the check pattern data by, for example, reading the check pattern data from the memory 90. On the other hand, in a case where the check pattern data is not recorded in the memory 90, the defect detection processing-execution unit 81 can acquire check pattern data from an external readable memory that is connected to the imaging apparatus 1 or from an external readable memory that is connected to a network connected to the imaging apparatus 1.

In a case where the defect detection processing-execution unit 81 acquires the check pattern data, the defect detection processing-execution unit 81 may be configured to operate each of the developing device 20, the toner image conveying device 25, the medium conveying device 10, the transfer device 30, the fixing device 50, and the like to sequentially form the fixing check toner images, the transfer check toner images, the conveyance check toner images, and the formation check toner images of the check pattern data.

The defect detection processing-execution unit 81 prescribes, specifies, or otherwise determines the stop state of each toner image of the check pattern data. The stop state may include at least one of: (1) a state where the fixing check toner image carried on at least one of the plurality of image carriers 40 is fixed to the sheet P, (2) a state where the transfer check toner image carried on at least one of the plurality of image carriers 40 is transferred to the sheet P and is positioned on the upstream side of the fixing device 50, (3) a state where the conveyance check toner images carried on the respective plurality of image carriers 40 are positioned on the transfer belt 31 between the plurality of image carriers 40 and between the image carrier 40, which is closest to the transfer device 30, and the transfer device 30, respectively, and (4) a state where the formation check toner images are positioned on the plurality of image carriers 40, respectively. In some examples, the stop state may be associated with one or more of the following operations or states: (1) the fixing check toner image carried on at least one of the plurality of image carriers 40 is fixed to the sheet P, (2) the transfer check toner image carried on at least one of the plurality of image carriers 40 is transferred to the sheet P and is positioned on the upstream side of the fixing device 50, (3) the conveyance check toner images carried on the respective plurality of image carriers 40 are positioned on the transfer belt 31 between the plurality of image carriers 40 and between the image carrier 40, which is closest to the transfer device 30, and the transfer device 30, respectively, and (4) the formation check toner images are positioned on the plurality of image carriers 40, respectively. Additionally, in a case where the transfer device 30 and the fixing device 50 are selected or otherwise operate as the toner image recording device 27 and the fixing check toner image, and the transfer check toner image is selected or otherwise operates as the recording check toner image, the stop state may include at least one of: (1) a state where the fixing check toner image carried on at least one of the plurality of image carriers 40 is recorded on the sheet P, (2) a state where the conveyance check toner images carried on the respective plurality of image carriers 40 are positioned on the toner image conveying device 25, that is, on the transfer belt 31 between the plurality of image carriers 40 and between the image carrier 40, which is closest to the transfer device 30, and the transfer device 30, respectively, and (3) a state where the formation check toner images are positioned on the plurality of image carriers 40, respectively. In some examples, the stop state may be associated with one or more of the following operations or states: (1) the fixing check toner image carried on at least one of the plurality of image carriers 40 is recorded on the sheet P, (2) the conveyance check toner images carried on the respective plurality of image carriers 40 are positioned on the toner image conveying device 25, that is, on the transfer belt 31 between the plurality of image carriers 40 and between the image carrier 40, which is closest to the transfer device 30, and the transfer device 30, respectively, and (3) the formation check toner images are positioned on the plurality of image carriers 40, respectively.

In the example check pattern data 92 illustrated in FIG. 4, and the stop state illustrated in FIG. 3, the stop state may be associated with one or more of the following operations or states: (1) the first toner image T1 is fixed to the sheet P, (2) the second toner image T2 is transferred to the sheet P and is positioned on the upstream side of the fixing device 50, (3) the third toner image T3 is positioned on the transfer belt 31 between the image carrier 40A and the transfer device 30, (4) the fourth toner image T4 is positioned on the image carrier 40A, (5) the fifth toner image T5 is positioned on the transfer belt 31 between the image carrier 40A and the image carrier 40B, (6) the sixth toner image T6 is positioned on the image carrier 40B, (7) the seventh toner image T7 is positioned on the transfer belt 31 between the image carrier 40B and the image carrier 40C, (8) the eighth toner image T8 is positioned on the image carrier 40C, (9) the ninth toner image T9 is positioned on the transfer belt 31 between the image carrier 40C and the image carrier 40D, and (10) the tenth toner image T10 is positioned on the image carrier 40D.

Additionally, the stop state prescribed, selected, or otherwise determined by the defect detection processing-execution unit 81 can be prescribed by, for example, by the amount of time elapsed after the defect detection processing is executed, the amount of time elapsed after the fixing check toner image starts to be formed, or the amount of time elapsed after the formation of the final formation check toner image has ended. Further, in a case where the stop state is registered in the memory 90, the stop state can be prescribed by, for example, determining, confirming or detecting that the position of each toner image becomes a stop state registered in the memory 90.

Furthermore, in a case where each toner image of the check pattern data 92 is in the prescribed stop state, the defect detection processing-execution unit 81 may be configured to stop one or more of: the formation of the toner images that is performed by the developing devices 20, the conveyance of the toner images that is performed by the toner image conveying device 25, and the conveyance of the sheet P that is performed by the medium conveying device 10. Accordingly, each toner image of the check pattern data 92 may be kept or maintained in the prescribed stop state.

In the case of the example check pattern data 92 illustrated in FIG. 4, and in view of the example defect detection process illustrated in FIG. 3, one or more of the following operations or operating states may be achieved: (1) the first toner image T1 is kept in a state where the first toner image T1 is fixed to the sheet P, (2) the second toner image T2 is kept in a state where the second toner image T2 is transferred to the sheet P and is positioned on the upstream side of the fixing device 50, (3) the third toner image T3 is kept in a state where the third toner image T3 is positioned on the transfer belt 31 between the image carrier 40A and the transfer device 30, (4) the fourth toner image T4 is kept in a state where the fourth toner image T4 is positioned on the image carrier 40A, (5) the fifth toner image T5 is kept in a state where the fifth toner image T5 is positioned on the transfer belt 31 between the image carrier 40A and the image carrier 40B, (6) the sixth toner image T6 is kept in a state where the sixth toner image T6 is positioned on the image carrier 40B, (7) the seventh toner image T7 is kept in a state where the seventh toner image T7 is positioned on the transfer belt 31 between the image carrier 40B and the image carrier 40C, (8) the eighth toner image T8 is kept in a state where the eighth toner image T8 is positioned on the image carrier 40C, (9) the ninth toner image T9 is kept in a state where the ninth toner image T9 is positioned on the transfer belt 31 between the image carrier 40C and the image carrier 40D, and (10) the tenth toner image T10 is kept in a state where the tenth toner image T10 is positioned on the image carrier 40D.

Accordingly, the check pattern data 92 and the defect detection process may be used by a checker, such as a worker, to determine which of the developing devices 20, the toner image conveying device 25, the transfer device 30, and the fixing device 50 is the reason of the image defect by confirming the state of each toner image through visual observation or the like in such a state.

For example, if a defect occurs in the first toner image T1 but a defect does not occur in the second toner image T2 in the case of FIG. 3, it can be determined that the image defect is caused by the fixing device 50. By way of further example, if a defect occurs in the second toner image T2 but a defect does not occur in the third toner image T3, it can be determined that the image defect is caused by the transfer device 30 (the secondary transfer roller 33 or the suspension roller 37). In some examples, if a defect occurs in the third toner image T3 but a defect does not occur in the fourth toner image T4, it can be determined that the image defect is caused by the primary transfer roller 32A. Additionally, if a defect occurs in the fourth toner image T4, it can be determined that the image defect is caused by the developing device 20A. In some examples, each of the relationships between the fifth toner image T5 and the sixth toner image T6, the seventh toner image T7 and the eighth toner image T8, and the ninth toner image T9 and the tenth toner image T10 may be the same as a relationship between the third toner image T3 and the fourth toner image T4, and therefore any duplicative description thereof will be omitted. Still further, if defects occur in the third toner image T3, the fifth toner image T5, the seventh toner image T7, and the ninth toner image T9, it can be determined that the image defect is caused by the transfer belt 31.

Then, after a checker, such as a worker, specifies a component, device, system or region that causes the image defect, the checker, such as a worker, performs maintenance work, such as repair or exchange/replacement.

In some examples, to allow each of the toner images to be visually recognized, the imaging apparatus 1 may include one or more doors or viewing ports (not illustrated) that can open and close or otherwise be used to view the conveying path of a sheet P on the upstream and downstream sides of the developing device 20, the toner image conveying device 25, the medium conveying device 10, the transfer device 30, and the fixing device 50.

With respect to maintenance, one or more of the developing device 20A, the developing device 20B, the developing device 20C, the developing device 20D, the transfer belt 31, the primary transfer roller 32A, the primary transfer roller 32B, the primary transfer roller 32C, the primary transfer roller 32D, the secondary transfer roller 33, the suspension roller 37, and the fixing device 50 may be configured to be separately replaceable in whole or by any number of sub-elements, e.g., partially replaced.

The defect detection processing-end unit 82 may be configured to execute the defect-detection-end process for ending the detection process in response to, for example, an operation performed by a checker, such as a worker. In some examples, one or more operations of the defect-detection-end process described below may be executed at the same time or may be executed separately, e.g., sequentially.

The defect detection processing-end unit 82 may be configured to operate and/or control the medium conveying device 10, the discharge device 60, and the like to discharge the sheet P, to which the fixing check toner images are fixed, to the outside. Further, the defect detection processing-end unit 82 may be configured to operate and/or control the fixing device 50, the medium conveying device 10, the discharge device 60, and the like to discharge the sheet P, to which the transfer check toner images are transferred, to the outside. Additionally, the sheet P to which the fixing check toner images are fixed and the sheet P to which the transfer check toner images are transferred may be the same sheets or may be different sheets.

The defect detection processing-end unit 82 may be configured to operate and/or control the toner image conveying device 25 and the like to collect the conveyance check toner images, which are present on the transfer belt 31, by a cleaning device (not illustrated) that is disposed on the downstream side of the transfer device 30 in the conveying direction of the transfer belt 31. In some examples, the conveyance check toner image may not be transferred to the sheet P. However, in a case where the conveyance check toner image is to be transferred to the sheet P, the defect detection processing-end unit 82 may operate and/or control the toner image conveying device 25, the transfer device 30, the fixing device 50, the medium conveying device 10, the discharge device 60, and the like to discharge the sheet P, to which the conveyance check toner images are fixed, to the outside.

The defect detection processing-end unit 82 may be configured to operate and/or control the developing devices 20 and the like to collect the formation check toner images, which are present on the image carriers 40, by the cleaning devices 43. In some examples, the formation check toner image may not be transferred to the transfer belt 31. However, in a case where the formation check toner image is to be transferred to the transfer belt 31, the defect detection processing-end unit 82 may operate and/or control the toner image conveying device 25, the transfer device 30, the fixing device 50, the medium conveying device 10, the discharge device 60, and the like to discharge the sheet P, to which the formation check toner images are fixed, to the outside.

An example operation for each of the defect detection processing and the defect-detection-end processing of the control device 80 will be described with reference to FIG. 5. For example, an operation for the processing of the control device 80 may be performed in a case where the control device 80 reads and executes the defect detection program 91 from the memory 90. In some examples, some of the operations to be described below may be performed at the same time or may be executed in a different order.

Figure 5:
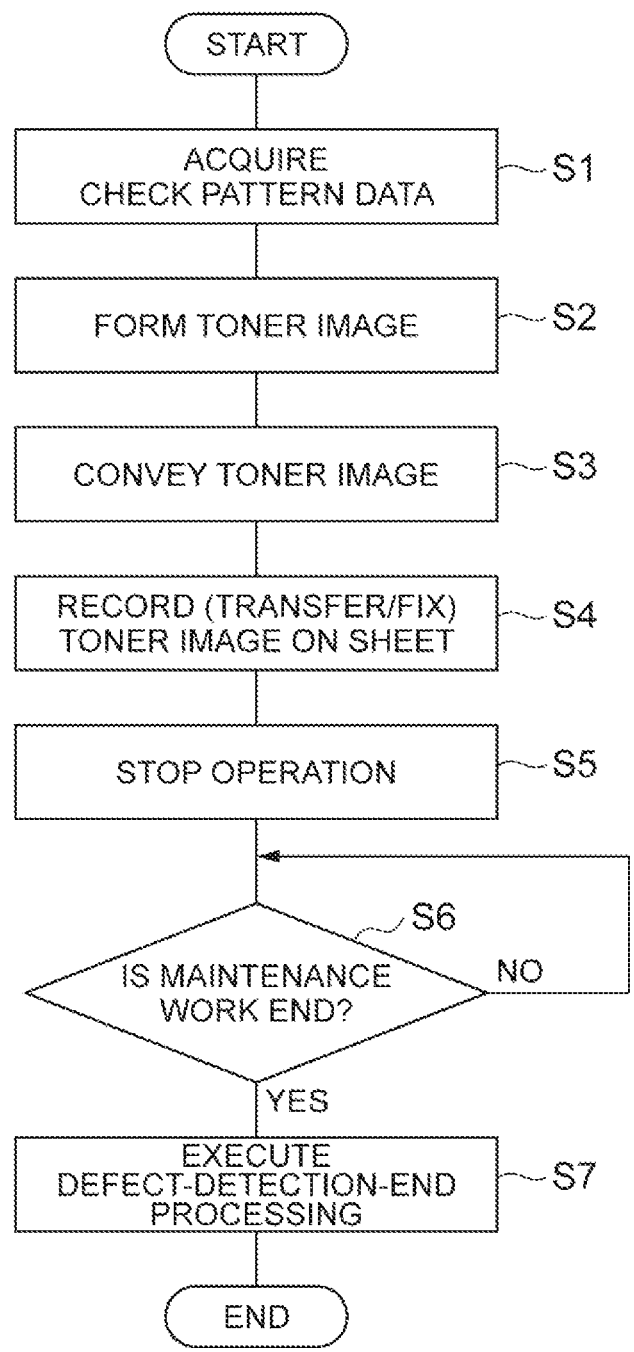
FIG. 5 is a flowchart illustrating an operation for example defect detection processing.

In a case where the control device 80 starts the defect detection processing, the control device 80 may acquire the check pattern data first, as illustrated in FIG. 5 (S1). The check pattern data may include, for example, the fixing check toner image, the transfer check toner image, the conveyance check toner image, and the formation check toner image that have been described above. In some examples, the acquisition of the check pattern data may be performed in a case where the check pattern data is read from the memory 90, may be performed in a case where the check pattern data is read from an external readable memory connected to the imaging apparatus 1, or may be performed in a case where the check pattern data is read from an external readable memory through a network connected to the imaging apparatus 1.

The control device 80 may be configured to form one or more of the fixing check toner image, the transfer check toner image, the conveyance check toner image, and the formation check toner image of the check pattern data acquired in Operation S1 (S2). Additionally, the control device 80 may be configured to convey the fixing check toner images, the transfer check toner images, and the conveyance check toner images, which are formed on the image carriers 40, by the toner image conveying device 25 (S3). Furthermore, the control device 80 may record the fixing check toner images and the transfer check toner images, which are conveyed by the toner image conveying device, on a sheet P (S4). In some examples, the operation of recording on the sheet P may be performed in a case where the fixing check toner images and the transfer check toner images conveyed by the toner image conveying device are transferred to the sheet P and the fixing check toner images, which are transferred to the sheet P, are fixed to the sheet P.

The control device 80 may prescribe, select or otherwise determine a stop state where the recording check toner images are recorded on the sheet P, the conveyance check toner images are positioned on the toner image conveying device, and the formation check toner images are positioned on the toner imaging devices. Additionally, the control device 80 may be configured to stop the formation of the toner images that is performed by the developing devices 20, the conveyance of the toner images that is performed by the toner image conveying device 25, and the conveyance of the sheet P that is performed by the medium conveying device 10, in the prescribed stop state (S5). In some examples, the control device 80 may prescribe, select or otherwise determine a stop state associated with one or more of the following states or operations: (1) the fixing check toner images are fixed to the sheet P, (2) the transfer check toner images are transferred to the sheet P and are positioned on the upstream side of the fixing device 50, (3) the conveyance check toner images are positioned on the transfer belt 31 between the plurality of image carriers 40 and between the image carrier 40, which is closest to the transfer device 30, and the transfer device 30, respectively, and (4) the formation check toner images are positioned on the plurality of image carriers 40, respectively. Additionally, the control device 80 may be configured to stop the operations of the image carriers 40, the transfer belt 31, and the medium conveying device 10 in the prescribed stop state.

Accordingly, a checker, such as a worker, confirms the state of each toner image through visual observation or the like, specifies or identifies a cause of the image defect, and performs maintenance work, such as repair or replacement.

The control device 80 may be configured to determine whether or not the maintenance work is ended by an operation performed by a checker, such as a worker (S6). Then, if the control device 80 determines that the maintenance work is ended (S6: YES), the control device 80 executes the defect-detection-end processing for ending the defect detection processing (S7). For example, the defect-detection-end process may be used to: (1) operate and/or control the medium conveying device 10, the discharge device 60, and the like to discharge the sheet P, to which the fixing check toner images are fixed, to the outside, (2) operate and/or control the fixing device 50, the medium conveying device 10, the discharge device 60, and the like to discharge the sheet P, to which the transfer check toner images are transferred, outside of the imaging apparatus 1, (3) operate and/or control the toner image conveying device 25 and the like to collect the conveyance check toner images, which are present on the transfer belt 31, by a cleaning device (not illustrated) that is disposed on the downstream side of the transfer device 30 in the conveying direction of the transfer belt 31, and (4) operate and/or control the developing devices 20 and the like to collect the formation check toner images, which are present on the image carriers 40, by the cleaning devices 43.

In some examples, the recording check toner images are kept or maintained in a recorded state on the sheet P, the conveyance check toner images are kept or maintained in a state where the conveyance check toner images are positioned on the toner image conveying device 25, and the formation check toner images are kept or maintained in a state where the formation check toner images are positioned on the developing devices 20. For example, a state where the fixing check toner images are fixed to the sheet P is kept; a state where the transfer check toner images are transferred to the sheet P and are positioned on the upstream side of the fixing device 50 is kept; a state where the conveyance check toner images are positioned on the transfer belt 31 between the plurality of image carriers 40 and between the image carrier 40, which is closest to the transfer device 30, and the transfer device 30, respectively, is kept; and a state where the formation check toner images are positioned on the plurality of image carriers 40, respectively, is kept. Accordingly, the cause of an image defect may be determined by visually recognizing these toner images.

The defect detection processing can be executed in a case where the check pattern data is stored in the memory 90.

In a case where the respective toner images of the check pattern data are formed in the same shape and the respective toner images of the check pattern data are spaced from each other, the defect of each toner image can therefore be confirmed.

In a case where the respective toner images of the check pattern data are formed in a rectangular shape that extends in the width direction of an image formed by the imaging apparatus 1 and the width of each toner image of the check pattern data is set to be equal to or larger than the maximum width W of the image, the cause of an image defect can be accurately determined.

In a case where the fixing check toner image and the transfer check toner image are to be carried on one of the plurality of image carriers 40, toner consumption can be reduced and the defect detection processing can be simplified. On the other hand, in a case where the fixing check toner image and the transfer check toner image are to be carried on each of the plurality of image carriers 40 and these toner images are to overlap each other and be transferred to the transfer belt 31, image defects, which occur when the toner images are superimposed, can also be identified.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

Figure 6:
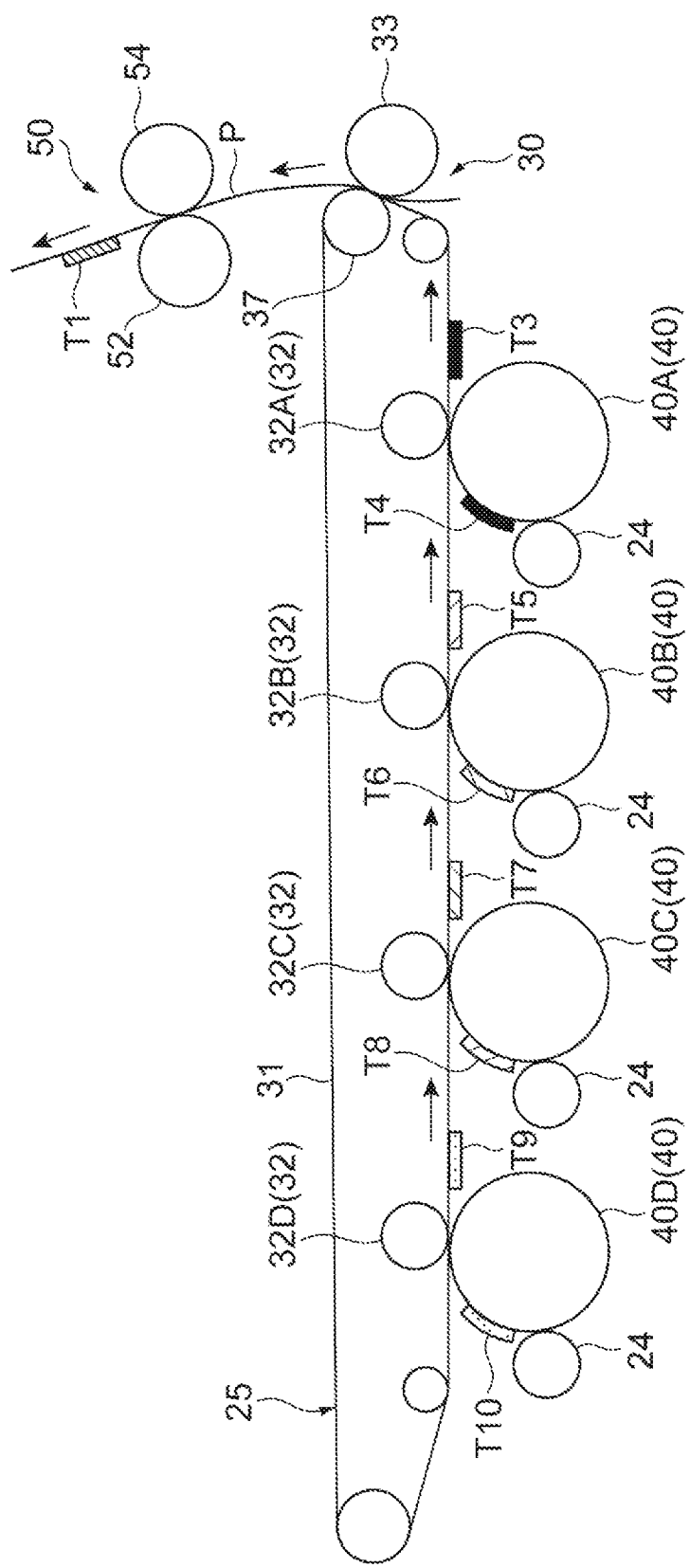
FIG. 6 is a schematic diagram illustrating another example defect detection process.
Figure 7:
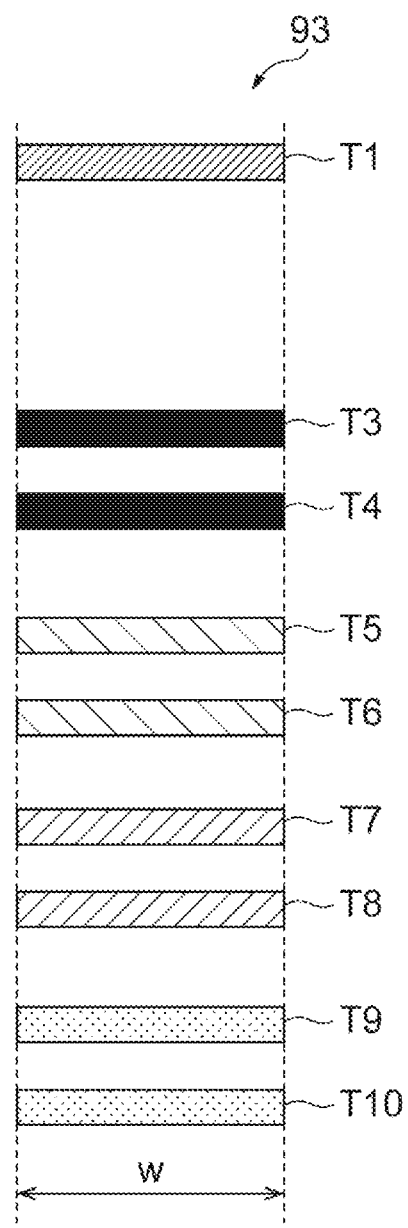
FIG. 7 is a diagram illustrating another example evaluation pattern.
Figure 8:
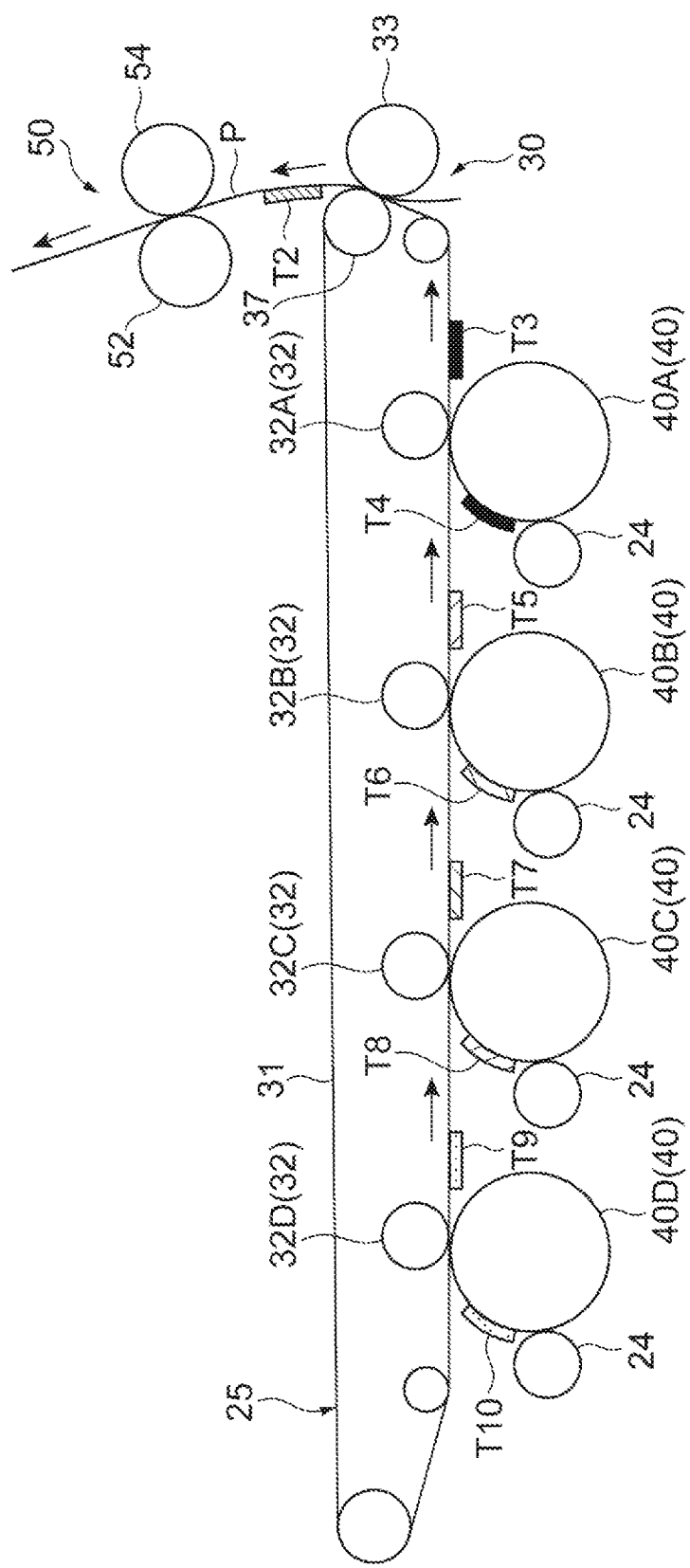
FIG. 8 is a schematic diagram for describing another example defect detection process.
Figure 9:
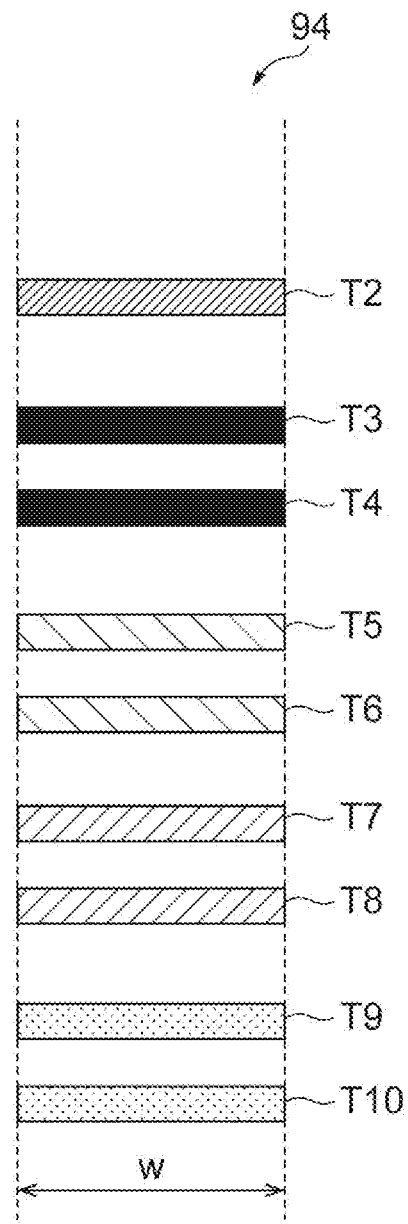
FIG. 9 is a diagram illustrating another example evaluation pattern.

In some examples, the check pattern data has been described as data including the fixing check toner image and the transfer check toner image. However, since both the fixing check toner image and the transfer check toner image form the recording check toner image, one of the fixing check toner image and the transfer check toner image may be may be selectively or exclusively used as the recording check toner image. For example, in a case where the fixing check toner image is used as the recording check toner image as in check pattern data 93 illustrated in FIG. 7, a state where a toner image is not held on the transfer belt 31 between the image carrier 40A and the transfer device 30 can be set as a stop state as illustrated in FIG. 6. On the other hand, in a case where the transfer check toner image is used as the recording check toner image as in check pattern data 94 illustrated in FIG. 9, a state where a toner image is not held on the upstream side of the fixing device 50 can be set as a stop state as illustrated in FIG. 8. Even in these cases, whether an image defect is caused by the fixing device 50 or the transfer device 30 may be specified by confirming each toner image.

Figure 10:
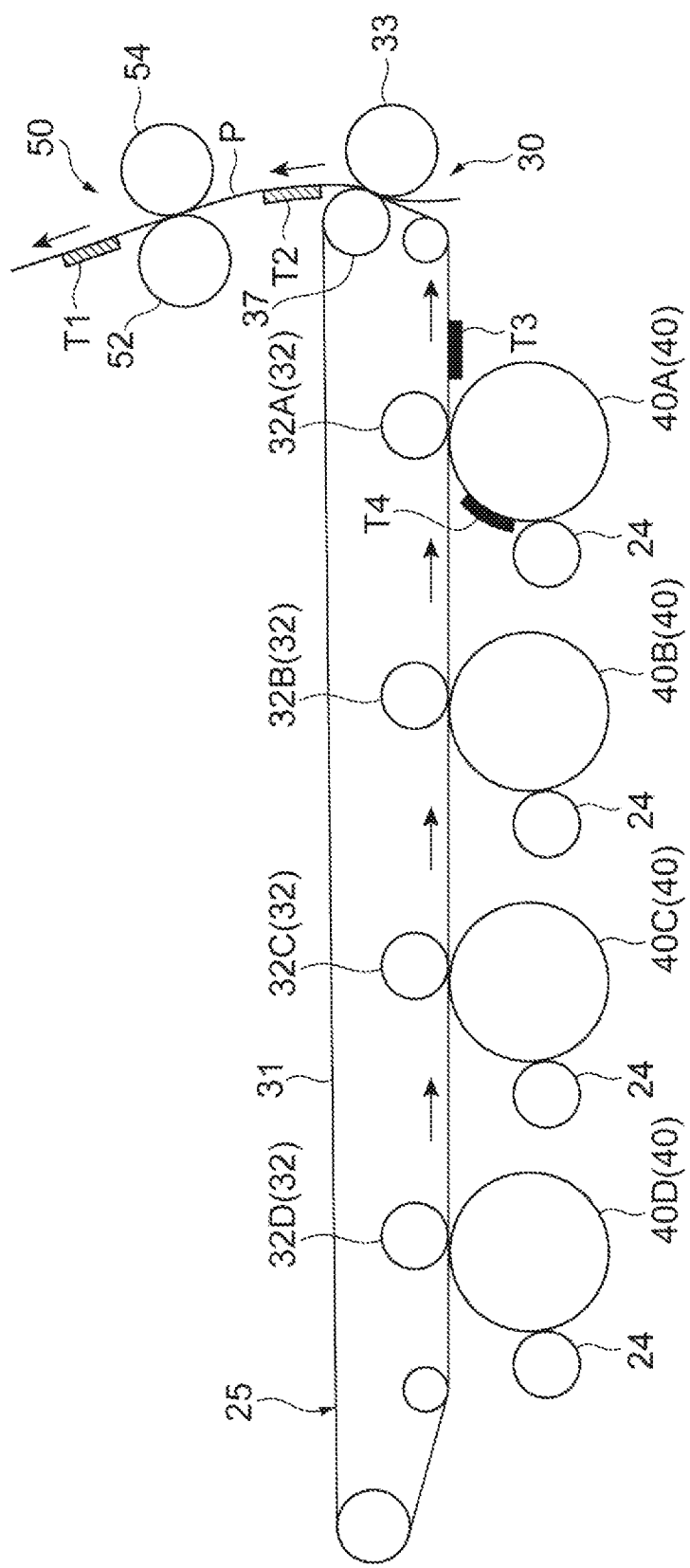
FIG. 10 is a schematic diagram for describing another example defect detection process.
Figure 11:
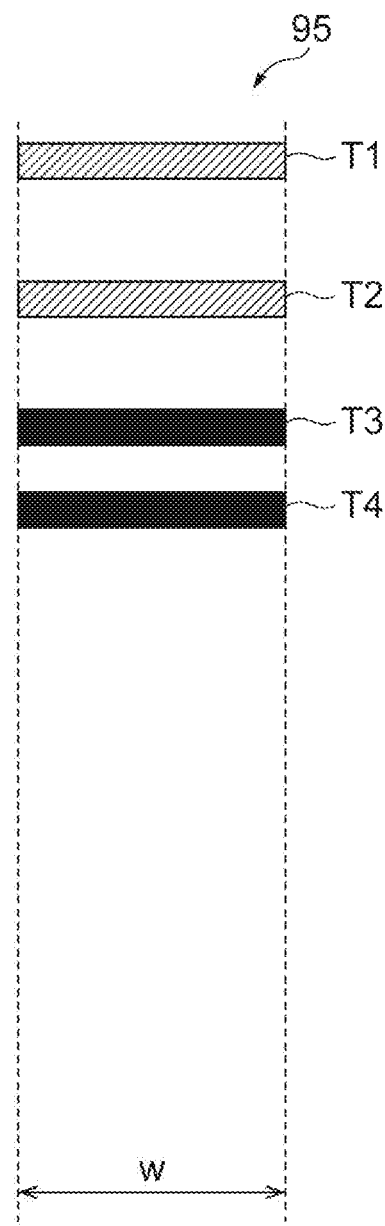
FIG. 11 is a diagram illustrating another example evaluation pattern.

The plurality of developing devices 20, including the toner imaging devices, have been described in some examples. However, one developing device 20, which is the toner imaging device, may be selectively or exclusively provided. Further, although all the developing devices 20 have been described in some examples as developing devices that form the conveyance check toner images and the formation check toner images, some of the developing devices 20 may be selected as the developing devices that form the conveyance check toner images and the formation check toner images. In these cases, for example, check pattern data 95 may include a first toner image T1 that is a fixing check toner image, a second toner image T2 that is a transfer check toner image, a third toner image T3 that is a conveyance check toner image, and a fourth toner image T4 that is a formation check toner image as illustrated in FIG. 11. Additionally, the image carrier 40A of the developing device 20A may form the first toner image T1, the second toner image T2, the third toner image T3, and the fourth toner image T4 as illustrated in FIG. 10.

A stop state may include at least one state selected from the group of states consisting of a state where the recording check toner image is recorded on a medium, a state where the conveyance check toner image is positioned on the toner image conveying device, and a state where the formation check toner image is positioned on the toner imaging device. Accordingly, the stop state may be a state including at least two states selected from the group states. Still further, the stop state may include all the states listed in the group of states. Even in this configuration, a portion where an image defect occurs may be readily determined by visually recognizing these toner images.

The invention claimed is:

1. An imaging system comprising:
a toner imaging device to form a toner image;
a toner image conveying device to convey the toner image;
a medium conveying device to convey a medium;
a toner image recording device to record the toner image conveyed by the toner image conveying device on the medium conveyed by the medium conveying device;
a control device to determine a stop state including at least one state of a state where a recording check toner image including a check pattern to indicate whether an image defect is caused by the toner image recording device is recorded on the medium, a state where a conveyance check toner image including a check pattern to indicate whether the image defect is caused by the toner image conveying device is positioned on the toner image conveying device, and a state where a formation check toner image including a check pattern to indicate whether the image defect is caused by the toner imaging device is positioned on the toner imaging device, wherein during the stop state, the control device to:
stop a formation of the toner image that is performed by the toner imaging device,
stop a conveyance of the toner image that is performed by the toner image conveying device, and
stop a conveyance of the medium that is performed by the medium conveying device; and
a memory to record the check pattern data including the recording check toner image, the conveyance check toner image, and the formation check toner image,
the toner imaging device to form the recording check toner image, to form the conveyance check toner image, and to form the formation check toner image on the basis of the check pattern data recorded in the memory.

2. The imaging system according to claim 1,
wherein the stop state determined by the control device includes at least two different states selected from the states.

3. The imaging system according to claim 1,
wherein the stop state determined by the control device includes all three states selected from the states.

4. The imaging system according to claim 3,
the check pattern data including a first toner image including one or more of a fixing check toner image, a second toner image that is a transfer check toner image, a third toner image that is the conveyance check toner image, a further toner image that is the formation check toner image, a fifth toner image that is the conveyance check toner image, a sixth toner image that is the formation check toner image, a seventh toner image that is the conveyance check toner image, an eighth toner image that is the formation check toner image, a ninth toner image that is the conveyance check toner image, and a tenth toner image that is the formation check toner image.

5. The imaging system according to claim 3,
wherein the recording check toner image, the conveyance check toner image, and the formation check toner image have a substantially identical shape.

6. The imaging system according to claim 3,
wherein the recording check toner image, the conveyance check toner image, and the formation check toner image have a rectangular shape that extends in a width direction of an image formed by the imaging system.

7. The imaging system according to claim 3,
wherein a width of each of the recording check toner image, the conveyance check toner image, and the formation check toner image is equal to or larger than a maximum width of an image formed by the imaging system.

8. The imaging system according to claim 1,
wherein the toner imaging device includes an image carrier to carry the toner image,
the toner image conveying device includes a transfer belt to which the toner image is to be transferred from the image carrier,
the toner image recording device includes a transfer device to transfer the toner image to the medium from the transfer belt, and
the control device to determine an additional stop state including at least one state of a state where the recording check toner image is transferred to the medium, a state where the conveyance check toner image is positioned on the transfer belt, and a state where the formation check toner image is positioned on the image carrier, and
wherein during the additional stop state, the control device to:
stop a carrying of the toner image by the image carrier,
stop a transferring of the toner image by the transfer belt, and
stop the conveyance of the medium that is performed by the medium conveying device.

9. The imaging system according to claim 1,
wherein the recording check toner image includes a fixing check toner image and a transfer check toner image,
the toner imaging device includes an image carrier to carry the toner image,
the toner image conveying device includes a transfer belt to which the toner image is to be transferred from the image carrier,
the toner image recording device includes a transfer device to transfer the toner image to the medium from the transfer belt and a fixing device to fix the toner image to the medium, and
the control device to determine an additional stopping state including at least one state of a state where the fixing check toner image is fixed to the medium, a state where the transfer check toner image is transferred to the medium and is positioned on the upstream side of the fixing device, a state where the conveyance check toner image is positioned on the transfer belt, and a state where the formation check toner image is positioned on the image carrier, and
wherein during the additional stopping state, the control device to:
stop a carrying of the toner image by the image carrier,
stop a transferring of the toner image by the transfer belt, and
stop the conveyance of the medium that is performed by the medium conveying device.

10. The imaging system according to claim 3,
wherein the toner imaging device includes a plurality of image carriers,
each of the plurality of image carriers to carry the conveyance check toner image and the formation check toner image,
at least one of the plurality of image carriers to carry the recording check toner image, and
each of the plurality of image carriers to carry the conveyance check toner image so that the conveyance check toner images carried on the plurality of image carriers do not overlap each other on the toner image conveying device.

11. The imaging system according to claim 10,
wherein one of the plurality of image carriers is to carry the recording check toner image.

12. The imaging system according to claim 10,
wherein each of the plurality of image carriers are to carry the recording check toner image, and
the recording check toner images, which are carried on the plurality of image carriers, are to be conveyed by the toner image conveying device in a state where the recording check toner images overlap each other.

13. An imaging system comprising:
a plurality of image carriers to carry toner images;
a transfer belt to which the toner images are to be transferred from the plurality of image carriers, the transfer belt to convey the toner images;
a medium conveying device to convey a medium;
a transfer device to transfer the toner images conveyed by the transfer belt to the medium conveyed by the medium conveying device;
a fixing device to fix the toner images transferred to the medium to the medium; and
a control device, wherein
at least one of the plurality of image carriers to carry a fixing check toner image including a check pattern to indicate whether an image defect is caused by the fixing device and a transfer check toner image including a check pattern to indicate whether the image defect is caused by the transfer device,
each of the plurality of image carriers to carry a conveyance check toner image including a check pattern to indicate whether the image defect is caused by the toner image conveying device and a formation check toner image including a check pattern to indicate whether the image defect is caused by the toner imaging device,
the transfer belt to convey the fixing check toner images, the transfer check toner images, and the conveyance check toner images,
the transfer device to transfer the fixing check toner images and the transfer check toner images to the medium from the transfer belt,
the fixing device to fix the fixing check toner images to the medium, and
the control device to determine a stop state where the fixing check toner images are fixed to the medium, the transfer check toner images are transferred to the medium and are positioned on the upstream side of the fixing device, the conveyance check toner images are positioned on the transfer belt between the plurality of image carriers and between the image carrier, which is closest to the transfer device, and the transfer device, respectively, and the formation check toner images are positioned on the plurality of image carriers, respectively, the control device to stop operations of the plurality of image carriers, the transfer belt, and the medium conveying device in the determined stop state; and a memory in which check pattern data including the fixing check toner images, the transfer check toner images, the conveyance check toner images, and the formation check toner images is recorded, wherein the imaging system to form the fixing check toner image, to form the transfer check toner image, to form the conveyance check toner image, and to form the formation check toner image on the basis of the check pattern data recorded in the memory, the imaging system to form the fixing check toner image, to form the transfer check toner image, to form the conveyance check toner image, and to form the formation check toner image on the basis of the check pattern data recorded in the memory.

14. The imaging system according to claim 13, wherein the plurality of image carriers to carry the toner images on the basis of the check pattern data recorded in the memory.

15. A non-transitory memory device having instructions stored thereon that, in response to execution by a processing device, cause the processing device to perform operations comprising:

forming a toner image by a toner imaging device;

conveying the toner image formed by the toner imaging device by a toner image conveying device;

recording the toner image conveyed by the toner image conveying device on a medium conveyed by the medium conveying device;

determining a stop state including at least one state of a state where a recording check toner image including a check pattern to indicate whether an image defect is caused by the toner image recording device is recorded on the medium, a state where a conveyance check toner image including a check pattern to indicate whether the image defect is caused by the toner image conveying device is positioned on the toner image conveying device, and a state where a formation check toner image including a check pattern to indicate whether the image defect is caused by the toner imaging device is positioned on the toner imaging device;

in the determined stop state, stopping the formation of the toner image that is performed by the toner imaging device, stopping the conveyance of the toner image that is performed by the toner image conveying device, and stopping the conveyance of the medium that is performed by the medium conveying device;

recording the check pattern data including the recording check toner image, the conveyance check toner image, and the formation check toner image in a memory; and forming the recording check toner image, the conveyance check toner image, and the formation check toner image on the basis of the check pattern data recorded in the memory.

16. The non-transitory memory device according to claim 15, wherein the stop state determined by the control device includes at least two different states selected from the states.

17. The non-transitory memory device according to claim 15 wherein the stop state determined by the control device includes all three states selected from the states.

18. The non-transitory memory device according to claim 17, the check pattern data including a first toner image including one or more of a fixing check toner image, a second toner image that is a transfer check toner image, a third toner image that is the conveyance check toner image, a further toner image that is the formation check toner image, a fifth toner image that is the conveyance check toner image, a sixth toner image that is the formation check toner image, a seventh toner image that is the conveyance check toner image, an eighth toner image that is the formation check toner image, a ninth toner image that is the conveyance check toner image, and a tenth toner image that is the formation check toner image.

19. The non-transitory memory device according to claim 17, wherein the recording check toner image, the conveyance check toner image, and the formation check toner image have a substantially identical shape.

20. The non-transitory memory device according to claim 17, wherein the recording check toner image, the conveyance check toner image, and the formation check toner image have a rectangular shape that extends in a width direction of an image formed by the imaging system.

\* \* \* \* \*